United States Patent

Ogikubo

[11] Patent Number: 5,994,990
[45] Date of Patent: Nov. 30, 1999

[54] MAGNET SHEET FOR DISPLAY

[75] Inventor: Konomu Ogikubo, Tokyo, Japan

[73] Assignee: MagX Co., Ltd., Tokyo, Japan

[21] Appl. No.: 08/891,160

[22] Filed: Jul. 10, 1997

[30] Foreign Application Priority Data

Jul. 11, 1996 [JP] Japan ................................. 8-201283

[51] Int. Cl.⁶ ................................................ H01F 7/20
[52] U.S. Cl. ......................... 335/285; 335/302; 335/303; 428/900; 40/600
[58] Field of Search .............. 428/694 BS, 900, 428/99; 40/600, 621; 335/302, 306, 285

[56] References Cited

U.S. PATENT DOCUMENTS

| | | |
|---|---|---|
| 3,451,161 | 6/1969 | Lemelson . |
| 4,098,935 | 7/1978 | Knudsen .................... 428/40 |
| 4,197,151 | 4/1980 | Muzik ....................... 156/249 |
| 4,366,637 | 1/1983 | Dechamps ................. 40/621 |
| 5,069,951 | 12/1991 | Egan ......................... 428/172 |
| 5,304,111 | 4/1994 | Mitsuno et al. ............. 600/9 |
| 5,356,717 | 10/1994 | Choki et al. ............... 428/425.9 |
| 5,459,439 | 10/1995 | Marausawa et al. ....... 333/1.1 |
| 5,503,891 | 4/1996 | Marshall et al. ........... 428/99 |

*Primary Examiner*—Michael L. Gellner
*Assistant Examiner*—Raymond Barrera
*Attorney, Agent, or Firm*—Wenderoth, Lind & Ponack, L.L.P.

[57] ABSTRACT

A magnet sheet 3 with a thickness of 0.05 to 0.15 mm is formed by molding a material obtained by adding magnetic particles to a synthetic resin material into a sheet and multiple pole magnetizing one surface of the sheet to form alternate N and S poles on that surface. A printing sheet 2 with a thickness of 0.05 to 0.15 mm, constituted by a paper sheet such as a high quality paper sheet or a coated paper sheet or a synthetic paper sheet or a synthetic resin film, is bonded to the non-magnetized surface of the magnet sheet 3. A magnet display sheet 1, which has a thickness of 0.1 mm to 0.3 mm, is thus obtained, and it is capable of being printing on with a usual home or office copier or printer.

5 Claims, 1 Drawing Sheet

MAGNET SHEET FOR DISPLAY

BACKGROUND OF THE INVENTION

1. Field of the Invention

This invention relates to magnetic sheets which can be directly magnetically attached to magnetic surfaces of steel boards, white boards, etc., and more particularly, to magnetic sheets for display which are capable of printing print contents thereon using home or business office printers, such as copiers, laser printers, ink jet printers, bubble jet printers, ink ribbon type heat-sensitive printers, dot printers, plotters, etc.

2. Prior Art

A magnet sheet, which is made of a material obtained by adding magnetic particles to a synthetic resin material and has one surface with alternate N and S magnetic poles formed by multiple pole magnetization, is sheet-like and flexible and can be magnetically and detachably attached to magnetic surfaces of steel boards, white boards, etc. Thus, it has extensive applications as marks for car driving beginners, business displays, document binders, drawing boards, and notices to be attached to magnetic surfaces.

The marks for car driving beginners and business displays are produced in a method, in which a white vinyl chloride sheet or like display sheet is bonded with an adhesive or the like to a magnet sheet and a desired display is formed by silk printing or the like on the display sheet, or a method, in which a display is printed in advance on a display sheet and then the display sheet is bonded likewise to a magnet sheet. They can be conveniently attached to surfaces of magnetic members such as steel boards.

Although displays using magnet sheets as above can be conveniently magnetically attached to any magnetic surface, they are expensive because each of them is prepared by the above method of bonding a white vinyl chloride sheet or like display sheet on a magnet sheet and printing a desired display content thereon by silk printing which requires a printing plate for each color or preliminarily printing a display content on a display sheet using a printer and bonding this display sheet to a magnet sheet. Also, the kind and form of the display are inevitably limited. Therefore, it is, presently necessary for general home or offices to purchase magnetic sheets for display, with impressions of display contents, from specialized shops, or displays have to be given up when magnetic sheets with desired display contents are not available.

SUMMARY OF THE INVENTION

In the above circumstances, there has been a demand for a magnetic display sheet, which permits general home or offices to readily and quickly form a desired display content on it and then magnetically attach it to a desired place without the need of purchasing a existing magnetic sheet available for display.

DETAILED DESCRIPTION OF THE PREFERRED EMBODIMENTS

Figure 1:
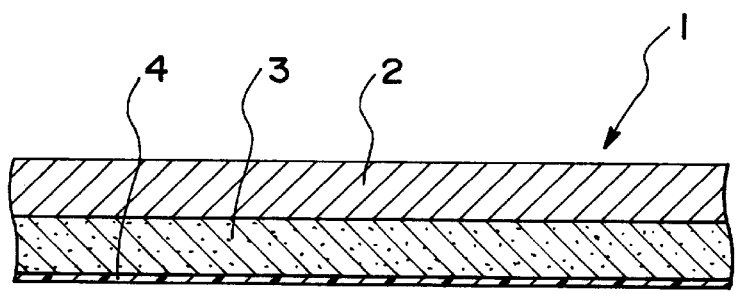
FIG. 1 is a sectional view showing a first embodiment of the magnetic display sheet according to the invention.

FIG. 1 shows a first embodiment of the magnetic display sheet according to the invention. Referring to the figure, reference numeral 1 designates a magnetic sheet for display. Reference numeral 2 designates a printing sheet consisting of a paper sheet, such as a high quality paper sheet or a coated paper sheet, or a synthetic paper sheet or a synthetic resin film and having a thickness of 0.05 to 0.15 mm. Reference numeral 3 designates a magnet sheet, which is made of a sheet-like material obtained by adding magnetic particles to a synthetic resin material and has at least one surface with alternate N and S poles formed by multiple pole magnetization. Reference numeral 4 designates an anti-transfer coating of a fluorine type material or the like formed on the magnetized surface of the magnet sheet 3.

The printing sheet 2 is suitably selected by taking the printing means used, purpose of use, cost, etc. into considerations, and it may be a sheet of cellulose fibers, an art paper sheet or a coated paper sheet obtained from the cellulose fiber sheet by coating a surface treatment material thereon, a synthetic paper sheet which is a thin synthetic resin film obtained from a synthetic resin material by adding white earth thereto or forming micropores therein, a synthetic resin film, etc. A high quality paper sheet is suitably used for printing with a copier, and a coated paper sheet or an art paper sheet is suitably used for printing with an ink jet printer, a bubble jet printer, etc.

When the thickness of the printing sheet 2 is excessive, printing with a printer cannot be obtained. When the printing sheet 2 has an insufficient thickness, on the other hand, the color (i.e., black color) of the back side magnet sheet 3 will be seen through it. For these reasons, the printing sheet 2 suitably has a thickness of 0.05 to 0.15 mm, preferably about 0.1 mm.

The magnet sheet 3 is formed by extrusion molding a synthetic resin material containing magnetic particles into a sheet. It has N and S poles formed on one surface by multiple pole magnetization and alternately arranged at a constant pitch of 2 to 3 mm. When the thickness of the magnet sheet 3 is excessive, printing with a home or office printer cannot be obtained. When the thickness is insufficient, on the other hand, it is difficult to maintain sufficient magnetic attraction force and intensity. For these reasons, the magnet sheet 3 suitably has a thickness of 0.05 to 0.15 mm, suitably 0.1 mm. This thickness corresponds to a fraction of the thickness and weight of commercially available magnet sheets.

The printing sheet 2 and the non-magnetized surface of the magnet sheet 3 are bonded together using an acryle urethane type or like adhesive. The thickness of the adhesive layer is very small compared to the overall thickness of the magnet sheet for display, and is substantially negligible. Under stringent conditions of its use such that it is held magnetically attached to a magnetic surface for long time or is heated in the magnetically attached state, the magnet sheet may be bonded to or contaminate the magnetic surface. Therefore, the anti-transfer coating 4 of a fluorine type or like material with a small coefficient of friction is provided to a thickness of several microns to the magnetized surface of the magnet sheet 3 for prevention thereof from being bonded to or contaminating the magnetic surface. A magnetic display sheet with a thickness of about 0.2 mm is thus completed, and it is cut to a suitable size and provided as a roll of sheet having a suitable length.

The thickness of 0.2 mm is substantially the same as the thickness of a thin name card, and thus the magnetic display sheet 1 according to the invention is capable of reliably printing using a usual home or office copier or printer. With the thickness of the magnet display sheet 1 set to about 0.2 mm, the magnet sheet 3 can be magnetized with a magnetizing force, which corresponds to ten times or above the weight of the magnet sheet 1 for display. Thus, even when the magnetic display sheet 1 is magnetized perpendicularly to the magnetic surface, it can be reliably held magnetically attached thereto without the possibility of spontaneous fall-down.

Figure 2:
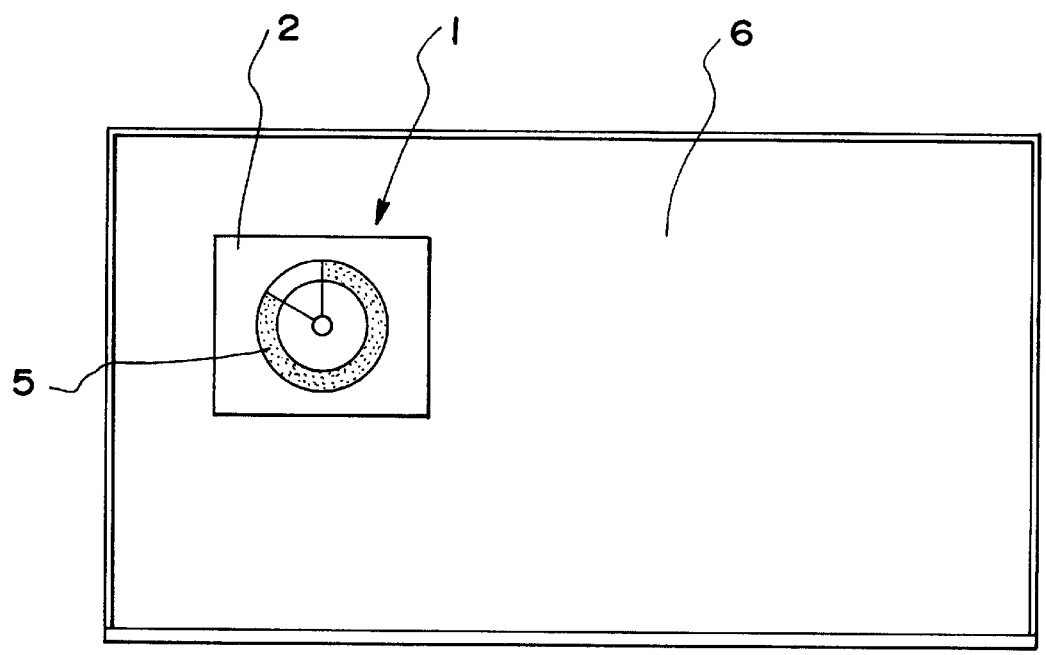
FIG. 2 is a view for describing how a magnetic display sheet for display according to the invention is used.

FIG. 2 shows how the magnetic display sheet 1 according to the invention is used. In this case, a display content 5, such as a graph, is printed on the printing sheet 2 of the sheet 1, and the sheet 1 is then magnetically attached to a magnetic surface 6 of a white board or the like. The magnetic surface 6 may be a white board, a partitioning member, a locker panel, a cabinet panel, etc., in a school, an office, etc.

The magnetic display sheet 1 may be used for company reports and photographs displayed on white boards or the like, teaching materials displayed on white boards or the like for school lessons or the like, materials utilized in conferences, or shop displays. Since the magnetic display sheet 1 is very thin, it can be readily cut like a paper sheet by using a scissors or a cutter into desired shapes.

Figure 3:
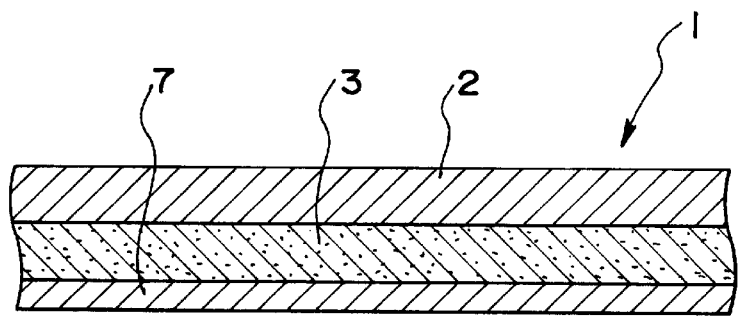
FIG. 3 is a sectional view showing a second embodiment of the magnetic display sheet according to the invention.

FIG. 3 shows a second embodiment of the magnetic display sheet according to the invention. Like the preceding first embodiment, this magnetic display sheet 1 comprises a printing sheet 2 with a thickness of 0.05 to 0.15 mm and a magnet sheet 3 with a thickness of 0.05 to 0.15 mm, these sheets being bonded together. In this embodiment, however, no anti-transfer coating is provided on the magnetized surface of the magnet sheet 3. Instead, a printing sheet 7 of the same material as the printing sheet 2 and with a thickness of 0.05 to 0.1 mm, is laminated on the magnetized surface of the magnet sheet 3 such that the overall thickness of the magnetic display sheet 1 has a thickness of 0.15 to 0.3 mm.

In the previous first embodiment of the magnetic display sheet 1, the printing sheet 2 and the magnet sheet 3 which are made of different materials, have different coefficients of expansion and elongation with changes in the temperature, relative humidity, etc. Therefore, when the magnet display sheet 1 is cut into small pieces, each cut piece may be warped or curled. In the second embodiment, the magnet sheet 3 is sandwiched between the two printing sheets of the same material, thus eliminating the elongation/contraction coefficient difference and hence the curling. Since the magnetized surface side printing sheet 7 in the second embodiment is not used for printing, it may be as thin as 0.05 mm so that the ground color of the magnet sheet can be seen through it.

Although not shown, it is possible to provide a double-side printable magnet display sheet 1 by multiple pole magnetizing both the surfaces of a magnet sheet 3 with a thickness of about 0.1 mm and bonding a printing sheet 2 about 0.1 mm thick to each magnetized surface of the magnet sheet.

As has been described in the foregoing, the magnet display sheet according to the invention is manufactured by molding a material obtained by adding magnetic particles to a synthetic resin material into a sheet in the form of a thin film, forming one surface of the sheet with alternate N and S poles by multiple pole magnetization, thereby forming a magnet sheet, and bonding a printing sheet constituted by a paper sheet such as a high quality paper sheet or a coated paper sheet or a synthetic paper sheet or synthetic resin film to the other surface of the magnet sheet, and it permits quick and ready printing of a desired display content on it with a usual home or office printer or copier. The printed magnet display sheet can be detachably magnetically attached to a magnetic surface of a steel board, a white board, etc. The magnet display sheet thus permits ready preparation of displays having desired shapes, such as company reports or photographs to be displayed on white boards or the like, teaching materials to be provided on white boards or the like for school, lessons or the like, materials used for conferences, and shop displays.

A different magnet display sheet according to the invention is manufactured by molding a material obtained by adding magnetic particles to a synthetic resin material into a sheet in the form of a thin film, forming at least one surface of the sheet with alternate N and S poles by multiple pole magnetization, thereby forming a magnet sheet, and bonding a printing sheet in the form of a thin film constituted by a paper sheet such as a high quality paper sheet or a coated paper sheet or a synthetic paper sheet or a synthetic resin film to each surface of the magnet sheet. Thus, while the magnet display sheet permits printing on it with a usual home or office printer or copier and detachably magnetically attaching it to a magnetic surface, with the magnet sheet sandwiched between the two printing sheets of the same material it is possible to eliminate curling due to the elongation/contraction coefficient difference between the magnet sheet and the printing sheet.

What is claimed is:

1. A magnetic display sheet for use with a printer or copier and a display surface, said magnetic display sheet comprising:

a magnet sheet having a magnetized surface, including alternate N and S poles formed by multiple pole magnetization, exhibiting a magnetic force at least ten times as great as the weight of said magnetic display sheet sufficient to magnetically attach and hold said magnetic display sheet to the display surface, and a non-magnetized surface, said magnet sheet having a thickness in the range of 0.05 to 0.15 mm; and a paper sheet for being printed on, said paper sheet having a thickness in the range of 0.05 to 0.15 mm, said paper sheet being bonded to said non-magnetized surface of said magnet sheet;

wherein said magnetic display sheet has a thickness in the range of 0.15 to 0.3 mm and can be used for printing in a printer or copier.

2. The magnetic display sheet as set forth in claim 1, further comprising an anti-transfer coating provided on said magnetized surface of said magnet sheet.

3. A magnetic display sheet for use with a printer or copier, said magnetic display sheet comprising:

a magnet sheet having a magnetized surface, including alternate N and S poles formed by multiple pole magnetization, exhibiting a magnetic force at least ten times as great as the weight of said magnetic display sheet sufficient to magnetically attach and hold said magnetic display sheet to the display surface, and a non-magnetized surface, said magnet sheet having a thickness in the range of 0.05 to 0.15 mm;

a first paper sheet for being printed on, said first paper sheet having a thickness in the range of 0.05 to 0.15 mm, said first paper sheet being bonded to said non-magnetized surface of said magnet sheet; and a second paper sheet, said second paper sheet having a thickness in the range of 0.05 to 0.1 mm, said second paper sheet being bonded to said magnetized surface of said magnet sheet;

wherein said magnetic display sheet has a thickness in the range of 0.15 to 0.3 mm and can be used for printing in a printer or copier.

4. A magnetic display sheet for use with a printer or copier, said magnetic display sheet comprising:

a magnet sheet having a first magnetized surface, including alternate N and S poles formed by multiple pole magnetization, exhibiting a magnetic force at least ten times as great as the weight of said magnetic display sheet sufficient to magnetically attach and hold said magnetic display sheet to the display surface, and a second magnetized surface, including alternate N and S poles formed by multiple pole magnetization, exhibiting a magnetic force at least ten times as great as the weight of said magnetic display sheet sufficient to magnetically attach and hold said magnetic display sheet to the display surface, said magnet sheet having a thickness of about 0.1 mm;

a first paper sheet for being printed on, said first paper sheet having a thickness of about 0.1 mm, said first paper sheet being bonded to said first magnetized surface of said magnet sheet; and a second paper sheet for being printed on, said second paper sheet having a thickness of about 0.1 mm, said second paper sheet being bonded to said second magnetized surface of said magnet sheet;

wherein said magnetic display sheet has a thickness in the range of 0.15 to 0.3 mm and can be used for printing in a printer or copier.

5. The magnetic display sheet as set forth in claim 4, wherein said magnetized surface of said magnet sheet comprises alternate N and S poles formed by multiple pole magnetization.

\* \* \* \* \*

(12) REEXAMINATION CERTIFICATE (4700th)
United States Patent
Ogikubo

(10) Number: US 5,994,990 C1
(45) Certificate Issued: Dec. 31, 2002

(54) MAGNET SHEET FOR DISPLAY

(75) Inventor: Konomu Ogikubo, Tokyo (JP)

(73) Assignee: MagX Co., Ltd., Tokyo (JP)

Reexamination Request:
No. 90/005,820, Sep. 15, 2000

Reexamination Certificate for:
Patent No.: 5,994,990
Issued: Nov. 30, 1999
Appl. No.: 08/891,160
Filed: Jul. 10, 1997

(21) Appl. No.: 08/891,160

(30) Foreign Application Priority Data

Jul. 11, 1996 (JP) .............................. 8-201283

(51) Int. Cl.$^7$ ................................ H01F 7/20
(52) U.S. Cl. .................. 335/285; 335/302; 335/303; 428/900; 40/600
(58) Field of Search .................. 333/285, 302–306; 428/99, 694 BS, 900; 40/600, 621

(56) References Cited

FOREIGN PATENT DOCUMENTS

| JP | 63-6128 | 10/1983 |
|---|---|---|
| JP | 7-226318 | 8/1995 |
| JP | 8-152859 | 6/1996 |

OTHER PUBLICATIONS

"Nikkei Mechanical," No. 484, Jul. 8, 1996.

*Primary Examiner*—Lincoln Donovan

(57) ABSTRACT

A magnet sheet 3 with a thickness of 0.05 to 0.15 mm is formed by molding a material obtained by adding magnetic particles to a synthetic resin material into a sheet and multiple pole magnetizing one surface of the sheet to form alternate N and S poles on that surface. A printing sheet 2 with a thickness of 0.05 to 0.15 mm, constituted by a paper sheet such as a high quality paper sheet or a coated paper sheet or a synthetic paper sheet or a synthetic resin film, is bonded to the non-magnetized surface of the magnet sheet 3. A magnet display sheet 1, which has a thickness of 0.1 mm to 0.3 mm, is thus obtained, and it is capable of being printing on with a usual home or office copier or printer.

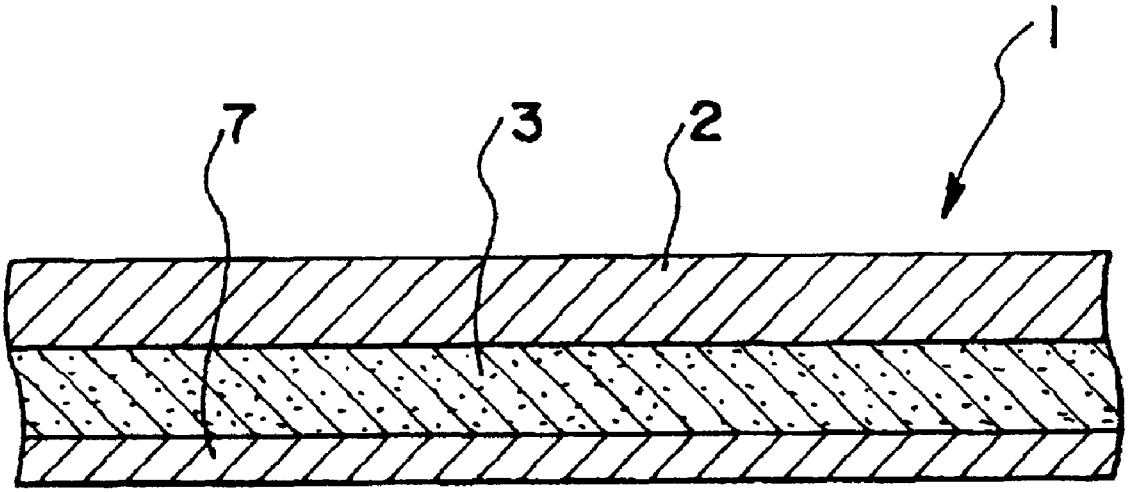

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 3–5 is confirmed.

Claims 1–2 are cancelled.

* * * * *